UNITED STATES PATENT OFFICE.

GEORG MERLING, OF FRANKFORT-ON-THE-MAIN, AND HEINRICH EICHWEDE, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

CYCLOGERANIOLIDENACETONE AND PROCESS OF MAKING SAME.

SPECIFICATION forming part of Letters Patent No. 768,389, dated August 23, 1904.

Application filed February 26, 1903. Serial No. 145,250. (No specimens.)

*To all whom it may concern:*

Be it known that we, GEORG MERLING, Ph. D., residing at Frankfort-on-the-Main, and HEINRICH EICHWEDE, Ph. D., residing at Höchst-on-the-Main, Germany, citizens of the Empire of Germany, have invented certain new and useful Improvements in the Manufacture of Alpha and Beta Cyclogeraniolidenacetone, of which the following is a specification.

We have found that by the action of sodium and carbonic acid on trimethylcyclohexanon

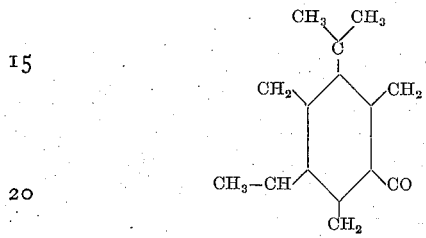

trimethylcyclohexanoncarbonic acid having the formula

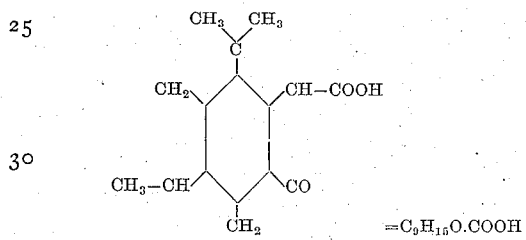

may be obtained, which is transformed by reducing agents into trimethyl-oxy-cyclohexancarbonic acid, having the formula

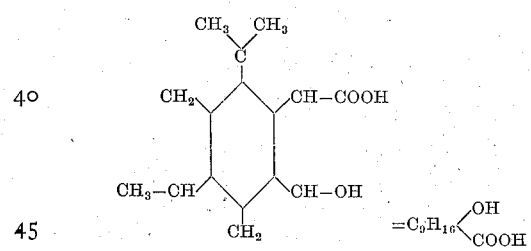

If the calcium salt of this acid is subjected to dry distillation in a vacuum with the equimolecular proportion of formate of calcium, not only the carboxyl of the acid is replaced by the formyl, but also water is simultaneously eliminated in the nucleus. Thus cyclogeraniolenaldehyde is obtained and this in two isomeric modifications

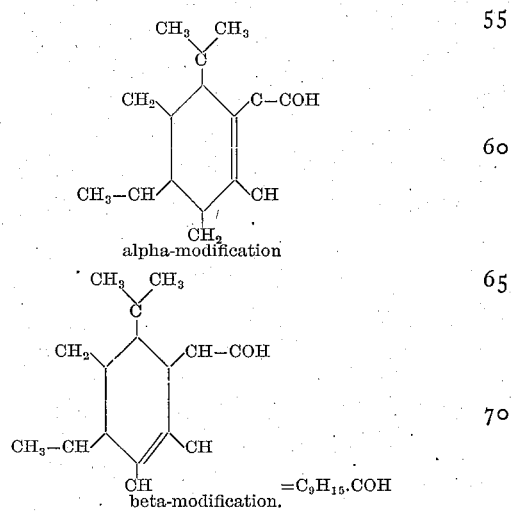

which we have not separated.

Cyclogeraniolenaldehyde is condensed with acetone to cyclogeraniolidenacetone, $C_9H_{15}.CH{=}CH{-}CO{-}CH_3$, an oil of the odor of violets.

*First. Manufacture of trimethylcyclohexanoncarbonic acid, $C_9H_{15}O.COOH$.*—In a vessel with reflux condenser four thousand five hundred parts of absolute ether are poured on ninety-eight parts of sodium, to which are gradually added four hundred and fifty parts of trimethylcyclohexanon. When the sodium is dissolved, dry carbonic acid is introduced while cooling into the clear solution until the acid is no longer absorbed. The sodium compound at first precipitated as a gelatinous mass becomes crystalline toward the end of the operation. On the reaction being complete ice-water is added, and the aqueous solution is separated from the ethereal layer containing unchanged trimethylcyclohexanon. To eliminate the trimethylcyclohexanol, the aqueous solution after standing twenty-four hours is extracted with ether and then acidified with dilute mineral acid, whereupon the trimethylcyclohexanoncarbonic acid separates as a crystalline mass. When recrystalized, it melts at 111° to 112° centigrade, carbonic acid being evolved.

*Second. Manufacture of trimethyl-oxy-cyclohexancarbonic acid,* $C_9H_{16}{<}^{OH}_{COOH}$.—

This acid is obtained by gradually introducing sodium amalgam, (about four thousand parts of amalgam of two per cent. and a strong current of carbonic acid into the dilute, cold solution of trimethylcyclohexanoncarbonate of sodium, one hundred parts.) On the reaction being complete the oxy-acid is precipitated as a crystalline mass on acidifying the solution separated from the mercury. This acid crystallizes from ethly acetate in colorless prisms, which melt at 185° centigrade and boil without decomposition at 203° to 205° centigrade, (ten millimeters.) The same trimethyl-oxy-cyclohexancarbonic acid, and one with this stereoisomerical oxy-acid, is obtained by electrolytical reduction of trimethylcyclohexanoncarbonic acid.

*Third. Manufacture of cyclogeraniolenaldehydes,* $C_9H_{15} \cdot COH$.—A thorough equimolecular mixture of the calcium salt of trimethyl-oxy-cyclohexancarbonic acid and formate of calcium is subjected to dry distillation while passing over a weak current of hydrogen under greatly-reduced pressure. At first water distils, then the aldehyde which collects as an oil in the receiver cooled with ice. When purified with steam and subsequently subjected to fractional distillation, it is a colorless oil of agreeable odor, which melts at 101° to 102° centigrade, (seventeen millimeters.)

*Fourth. Manufacture of cyclogeraniolidenacetone,* $C_9H_{15} \cdot CH=CH-CO-CH_3$.—To manufacture this compound with a satisfactory yield offers certain difficulties, as the cyclogeraniolenaldehyde obtained by Example 3 consists of two isomeric modifications, (alpha and beta,) of which the alpha condenses with acetone already at ice temperature, whereas the beta condenses with acetone first at a high temperature in presence of agents of alkaline reaction. Attempts to condense a mixture of aldehyde with acetone at once at a high temperature gave little satisfactory results, as the acetone condensation products, especially that of the alpha-modification, are very sensible toward agents of alkaline reaction, being further decomposed and becoming resinous. We have found that these difficulties may be overcome by first condensing the more easily-reacting alpha-modification of the aldehyde mixture with acetone at a low temperature and in presence of very dilute alkaline agents or such of feeble reaction by isolating the beta-modification of the aldehyde not having entered into reaction and by then causing acetone and condensing agents to act on it at a high temperature. Any agent of alkaline reaction is suitable for condensation, such as caustic potash, caustic soda, alkaline earths, magnesium, borax, sodium phosphate, sodium alcoholate, and the like. Condensation even occurs by heating the aldehyde with acetone alone in a closed tube at a high temperature.

Example: Fifteen parts of cyclogeraniolenaldehyde (mixtures of the alpha and beta modifications having the point of ebullition 101° to 102° centigrade, seventeen millimeters pressure) are dissolved in fifty parts of pure acetone, to which is added while cooling with ice a cold solution of 0.75 parts of sodium in fifteen parts of absolute alcohol. The mixture is left standing in ice for one hour and at ordinary temperature for some further hours, whereupon the solution becomes yellow-red and finally brown-red. It is then poured on ice, neutralized with tartaric acid, and the unchanged aldehyde (beta-modification) and acetone condensation product thus obtained are distilled with steam. Ten parts of the thus isolated beta-cyclogeraniolenaldehyde are dissolved in forty parts of pure anhydrous acetone, and the solution is heated for twenty-four hours, with one part of finely-ground barium oxid on the boiling-water bath. It is then filtered. The filtrate is diluted with water, and the solution is saturated with carbonic acid. The beta-cyclogeraniolidenacetone is driven over with steam and then purified by distillation in vacuum.

*Alpha and Beta Cyclogeraniolidenacetone.*

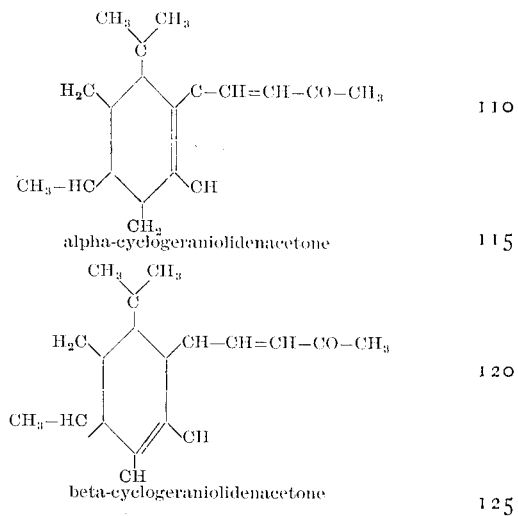

alpha-cyclogeraniolidenacetone beta-cyclogeraniolidenacetone are colorless oils boiling at 132° to 134° centigrade, (ten millimeters pressure.)

When concentrated they have an intense odor of cedar wood and when strongly diluted that of violets.

Having now described our invention, what we claim is—

1. The process herein described of making a mixture of alpha and beta cyclogeranioliden-acetone, which consists in treating alpha and beta cyclogeraniolene-aldehyde with acetone in the presence of an alkaline agent, substantially as set forth.

2. As a new product, a mixture of alpha and beta cyclogeraniolidenacetone, being a colorless oil, boiling at 132° to 134° centigrade (ten millimeters pressure) and having when concentrated an intense odor of cedar wood and of violets when strongly diluted.

In testimony that we claim the foregoing as our invention we have signed our names in presence of two subscribing witnesses.

GEORG MERLING.
HEINRICH EICHWEDE.

Witnesses:
ALFRED BRISBOIS,
BERNHARD LEYDECKER.